US012174554B2

(12) United States Patent
Otsuka

(10) Patent No.: US 12,174,554 B2
(45) Date of Patent: Dec. 24, 2024

(54) IMAGE FORMING APPARATUS WITH REPOSITIONABLE SHUTTER ASSEMBLY

(71) Applicant: TOSHIBA TEC KABUSHIKI KAISHA, Tokyo (JP)

(72) Inventor: Takuya Otsuka, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 28 days.

(21) Appl. No.: 18/145,818

(22) Filed: Dec. 22, 2022

(65) Prior Publication Data

US 2023/0126318 A1 Apr. 27, 2023

Related U.S. Application Data

(63) Continuation of application No. 17/466,727, filed on Sep. 3, 2021, now Pat. No. 11,561,484.

(51) Int. Cl.

*G03G 15/01* (2006.01)
*G03G 15/04* (2006.01)
*G03G 15/05* (2006.01)
*G03G 15/16* (2006.01)

(Continued)

(52) U.S. Cl.

CPC ..... *G03G 15/011* (2013.01); *G03G 15/04036* (2013.01); *G03G 15/052* (2013.01); *G03G 21/1666* (2013.01); *G03G 21/1832* (2013.01); *G03G 15/167* (2013.01); *G03G 2215/0103* (2013.01); *G03G 2221/1636* (2013.01)

(58) Field of Classification Search

CPC .. G03G 15/011; G03G 15/052; G03G 15/167; G03G 15/4036; G03G 21/1832; G03G 21/1666; G03G 2215/0103; G03G 2221/1636

See application file for complete search history.

(56) References Cited

U.S. PATENT DOCUMENTS 5,936,652 A 8/1999 Narayan et al.
11,036,178 B1 6/2021 Otsuka (Continued)

FOREIGN PATENT DOCUMENTS

JP 2011-025631 A 2/2011

OTHER PUBLICATIONS

Non-Final Office Action on U.S. Appl. No. 17/466,727 Dtd Jun. 9, 2022.

(Continued)

*Primary Examiner* — Joseph S Wong
(74) *Attorney, Agent, or Firm* — FOLEY & LARDNER LLP

(57) ABSTRACT

An image forming apparatus includes a photoconductor, an exposure device, and a shutter assembly. The exposure device includes a light source configured to expose the photoconductor. The light source is repositionable between a proximity position at a first distance from the photoconductor and a separation position at a second distance from the photoconductor. The first distance is less than the second distance. The shutter assembly is configured to move away from the light source in response to the light source moving toward the proximity position. The shutter assembly is configured to move to cover the optical path of the light source in response to the light source moving toward the separation position.

13 Claims, 12 Drawing Sheets

(51) Int. Cl.
*G03G 21/16* (2006.01)
*G03G 21/18* (2006.01)

(56) References Cited

U.S. PATENT DOCUMENTS

| | | | | |
|---|---|---|---|---|
| 2010/0080623 | A1* | 4/2010 | Tanaka | G03G 21/1666 399/118 |
| 2017/0371292 | A1 | 12/2017 | Narita et al. | |
| 2018/0101131 | A1 | 4/2018 | Hosoi et al. | |
| 2019/0278215 | A1 | 9/2019 | Ao et al. | |
| 2019/0278216 | A1* | 9/2019 | Tomatsu | G03G 21/1671 |
| 2020/0292984 | A1 | 9/2020 | Iwai et al. | |
| 2020/0301344 | A1 | 9/2020 | Kojima et al. | |

OTHER PUBLICATIONS

Notice of Allowance on U.S. Appl. No. 17/466,727 Dtd Sep. 23, 2022.

* cited by examiner

IMAGE FORMING APPARATUS WITH REPOSITIONABLE SHUTTER ASSEMBLY

CROSS-REFERENCE TO RELATED PATENT APPLICATION

This application is a continuation of U.S. patent application Ser. No. 17/466,727, filed Sep. 3, 2021, which is incorporated herein by reference in its entirety.

FIELD

Embodiments described herein relate generally to an image forming apparatus.

BACKGROUND

When writing an image to a photoconductor, the print head of an image forming apparatus is positioned at a predetermined position close to a photoconductive unit in order to secure a focal position with the photoconductor. The print head is separated from the photoconductive unit, for example, during maintenance of the photoconductor. For example, when cleaning the print head, a user inserts a cleaning rod having a non-woven fabric or the like attached to the tip into a space created by separating the print head from the photoconductive unit to clean the surface of the print head.

DETAILED DESCRIPTION

In general, according to one embodiment, an image forming apparatus includes a photoconductor, an exposure device, and a shutter assembly. The exposure device includes a light source configured to expose the photoconductor. The light source is repositionable between a proximity position at a first distance from the photoconductor and a separation position at a second distance from the photoconductor. The first distance is less than the second distance. The shutter assembly is configured to move away from the light source in response to the light source moving toward the proximity position. The shutter assembly is configured to move to cover the optical path of the light source in response to the light source moving toward the separation position.

An image forming apparatus 10 according to at least one embodiment will be described with reference to FIGS. 1 to 10.

Figure 1:
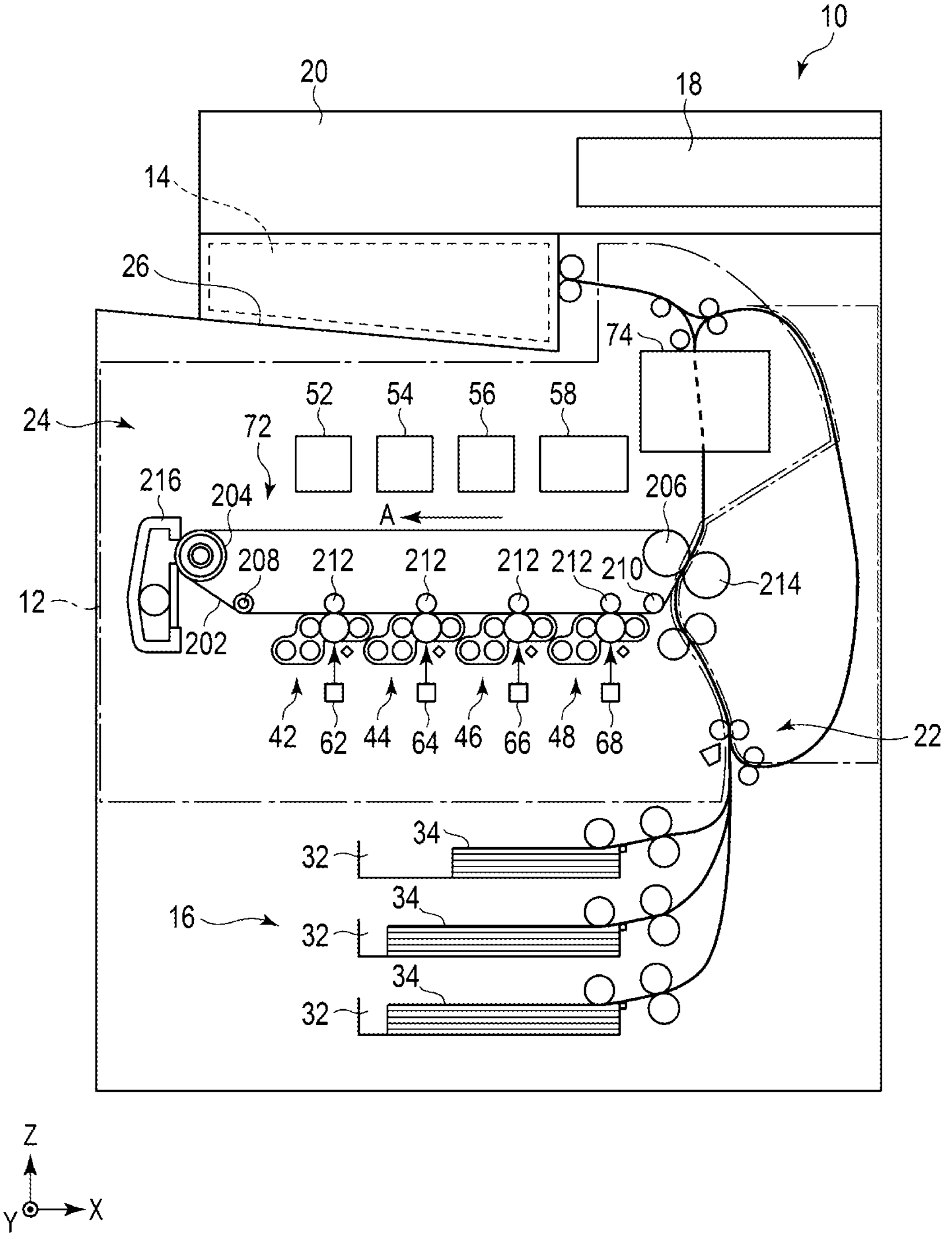
FIG. 1 is a schematic view of an image forming apparatus according to an embodiment.

FIG. 1 illustrates the image forming apparatus 10. In describing the image forming apparatus 10, an X axis is defined whose +direction is from the left side to the right side when viewed from the front side of the image forming apparatus 10, a Y axis is defined whose +direction is from the back side to the front side, and a Z axis is defined whose +direction is from the bottom side to the top side. The direction along the X axis is along the left-right direction when viewed from the front side of the image forming apparatus 10. The direction along the Y axis is along the front-rear direction when viewed from the front side of the image forming apparatus 10. The direction along the Z axis is along the top-bottom direction when viewed from the front side of the image forming apparatus 10.

Figure 2:
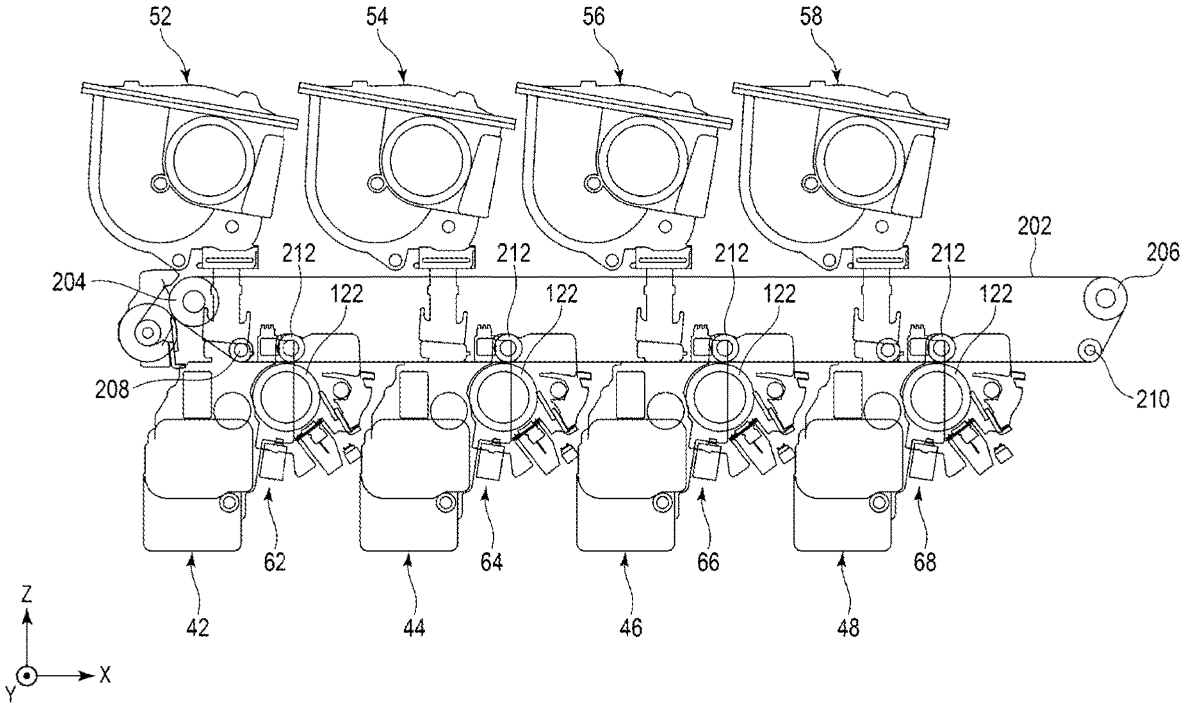
FIG. 2 is a view of a part of a printer from the front side of the image forming apparatus.

FIG. 2 is a view of image forming units 42, 44, 46, and 48 of a printer 24, toner cartridges 52, 54, 56, and 58, solid-state head units 62, 64, 66, and 68, and a transfer unit 72 viewed from the front side of the image forming apparatus 10.

Figure 3:
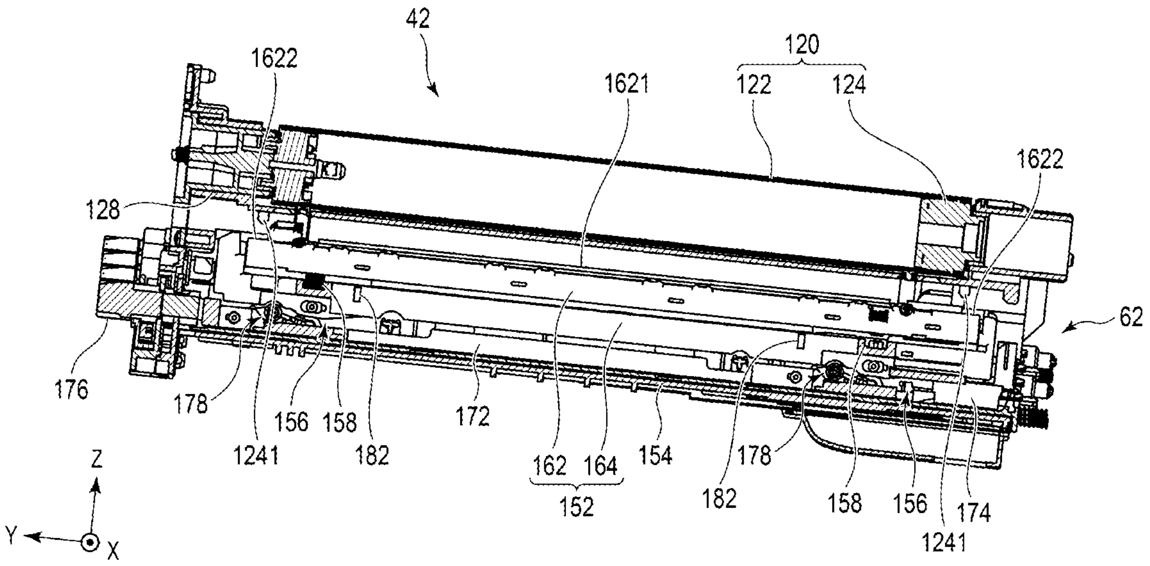
FIG. 3 is a section view of a solid-state head unit of the image forming apparatus along the longitudinal direction of an exposure device and a photoconductive unit.
Figure 4:
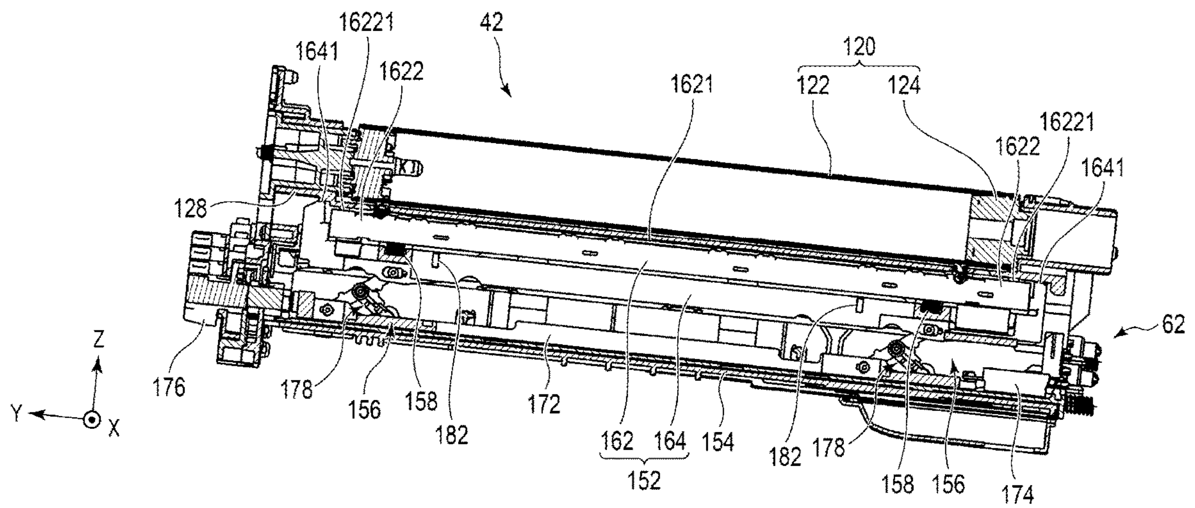
FIG. 4 is a section view of the solid-state head unit along the longitudinal direction of the exposure device and the photoconductive unit.

FIG. 3 is a cross-sectional view illustrating a state in which an exposure device 152 of the solid-state head unit 62 is separated from a photoconductive drum 122 of a photoconductive unit 120. FIG. 4 is a cross-sectional view illustrating a state in which the exposure device 152 of the solid-state head unit 62 is brought in close proximity to the photoconductive drum 122 of the photoconductive unit 120.

Figure 5:
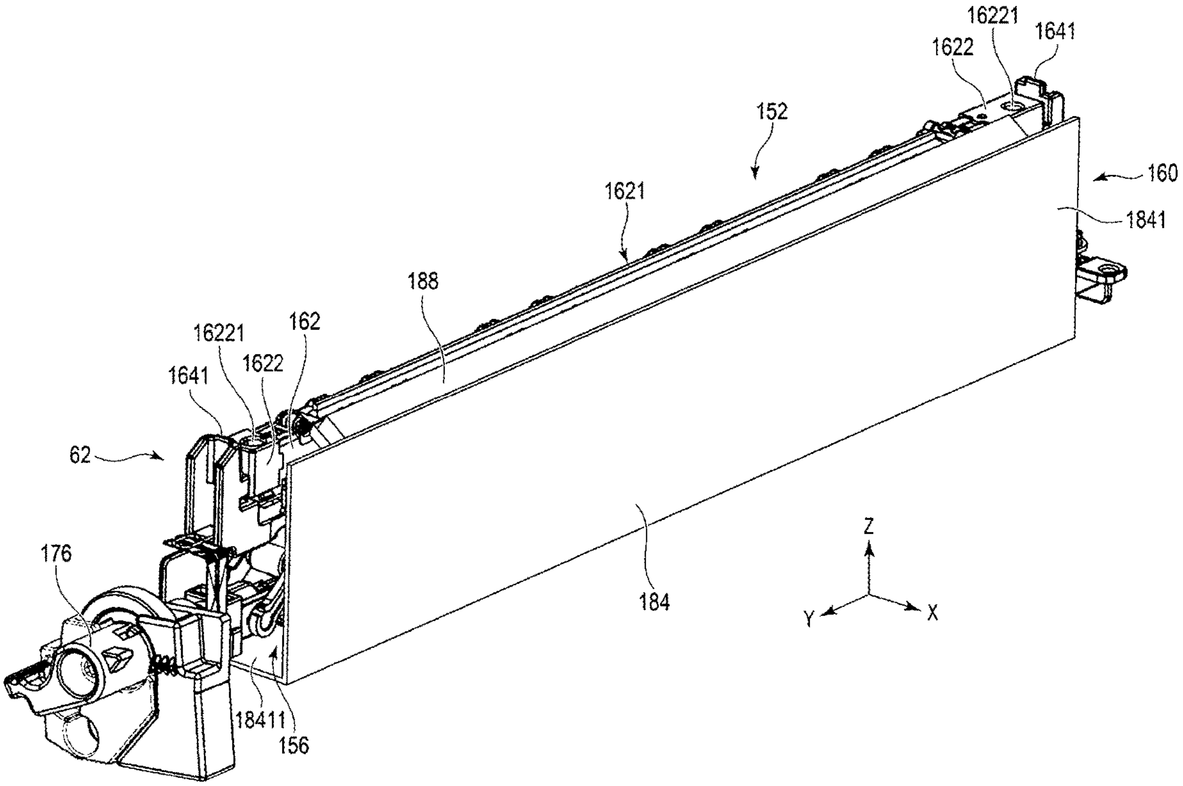
FIG. 5 is a perspective view of the solid-state head unit.
Figure 6:
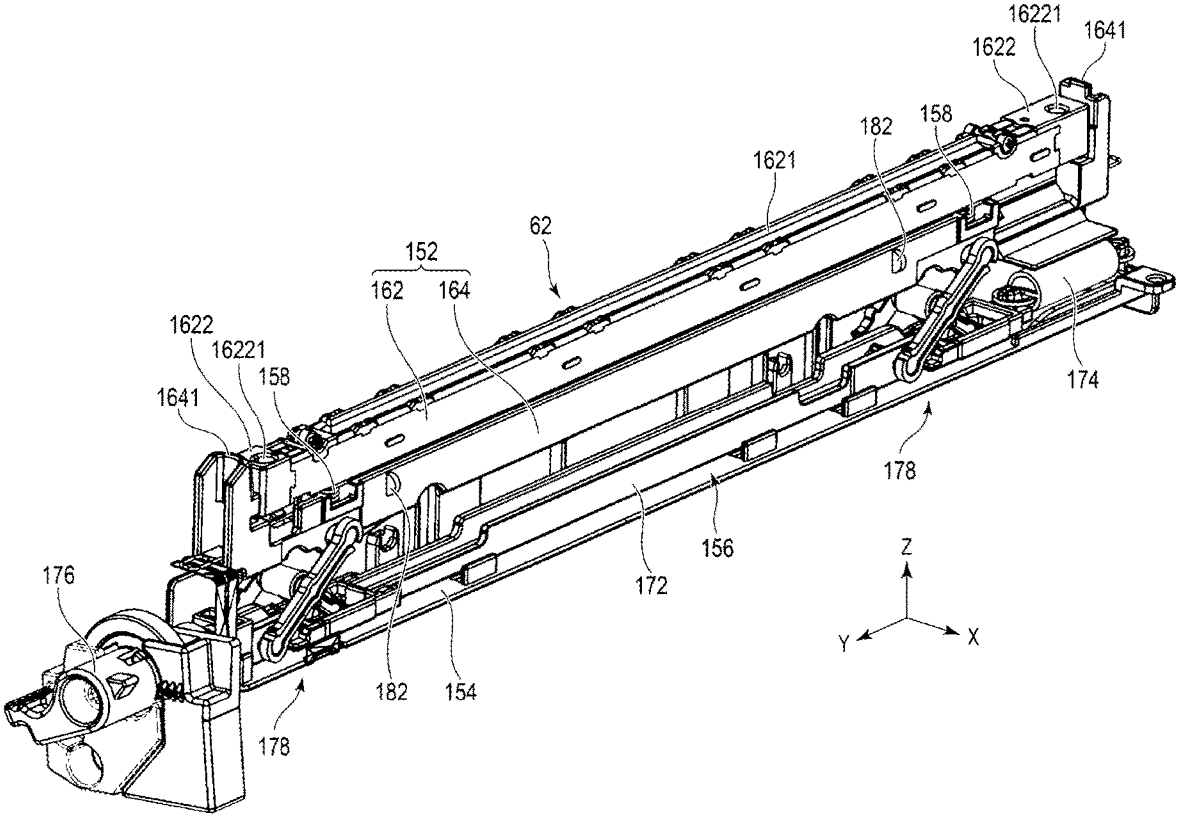
FIG. 6 is a perspective view illustrating a state in which a support portion is removed from the solid-state head unit illustrated in FIG. 5.
Figure 7:
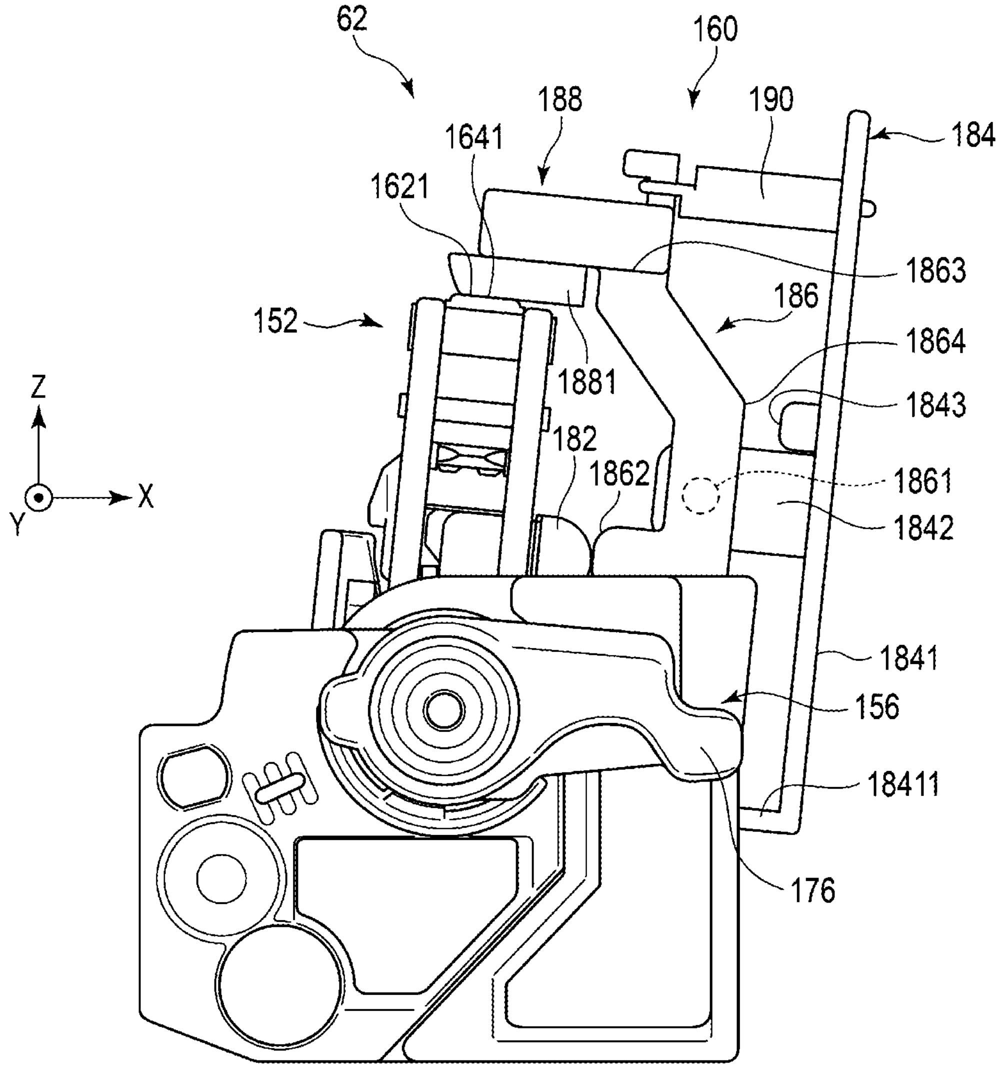
FIG. 7 is a side view illustrating a state in which a print head is protected by a shutter member of a shutter of the solid-state head unit.
Figure 8:
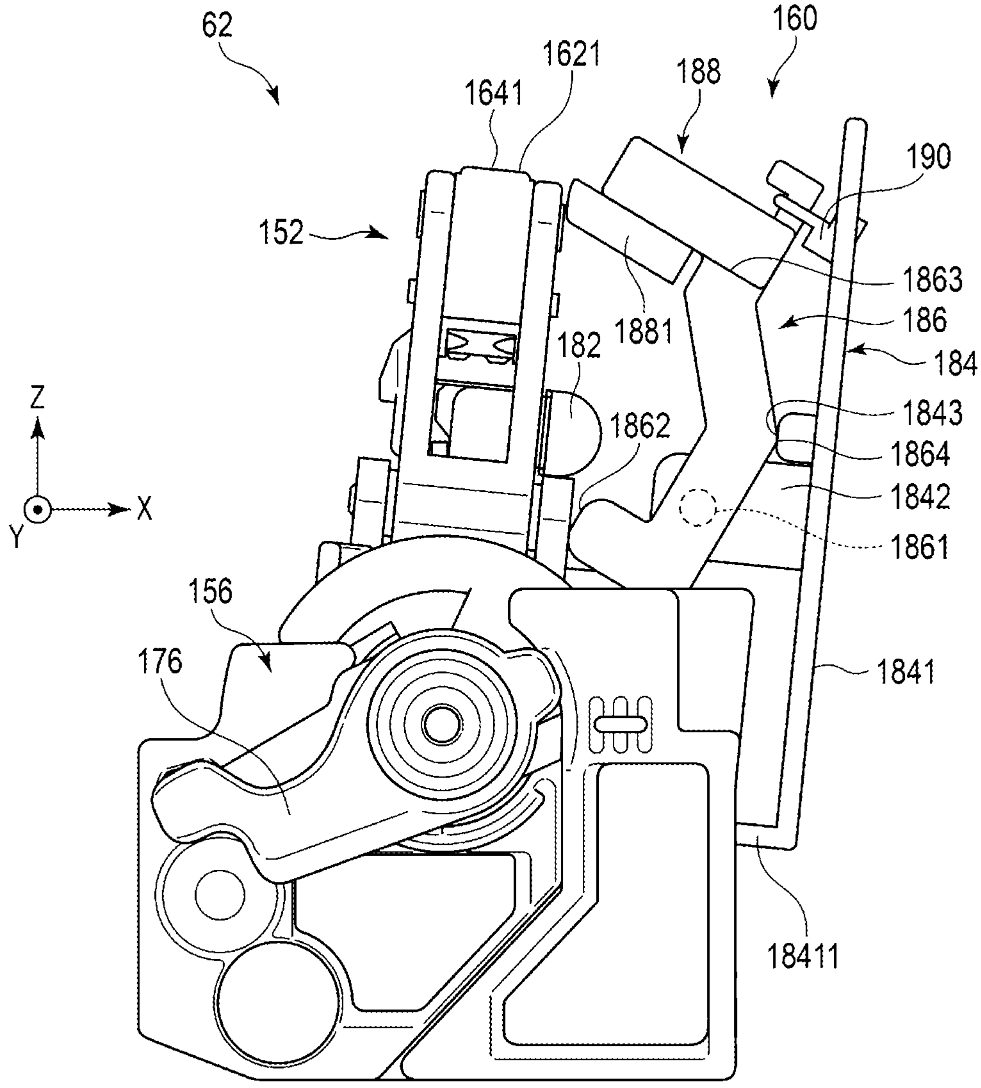
FIG. 8 is a side view illustrating a state in which the shutter member of the shutter of the solid-state head unit is retracted from the print head.

FIG. 5 is a perspective view of the solid-state head unit according to the embodiment. FIG. 6 is a perspective view illustrating a state in which a support portion 184 is removed from the solid-state head unit illustrated in FIG. 5. FIG. 7 is a side view illustrating a state in which a print head 162 is held by a shutter member 188 of a shutter 160 (e.g., a shutter assembly) of the solid-state head unit 62. FIG. 8 is a side view illustrating a state in which the shutter member 188 of the shutter 160 of the solid-state head unit 62 is retracted from the print head 162.

Figure 9:
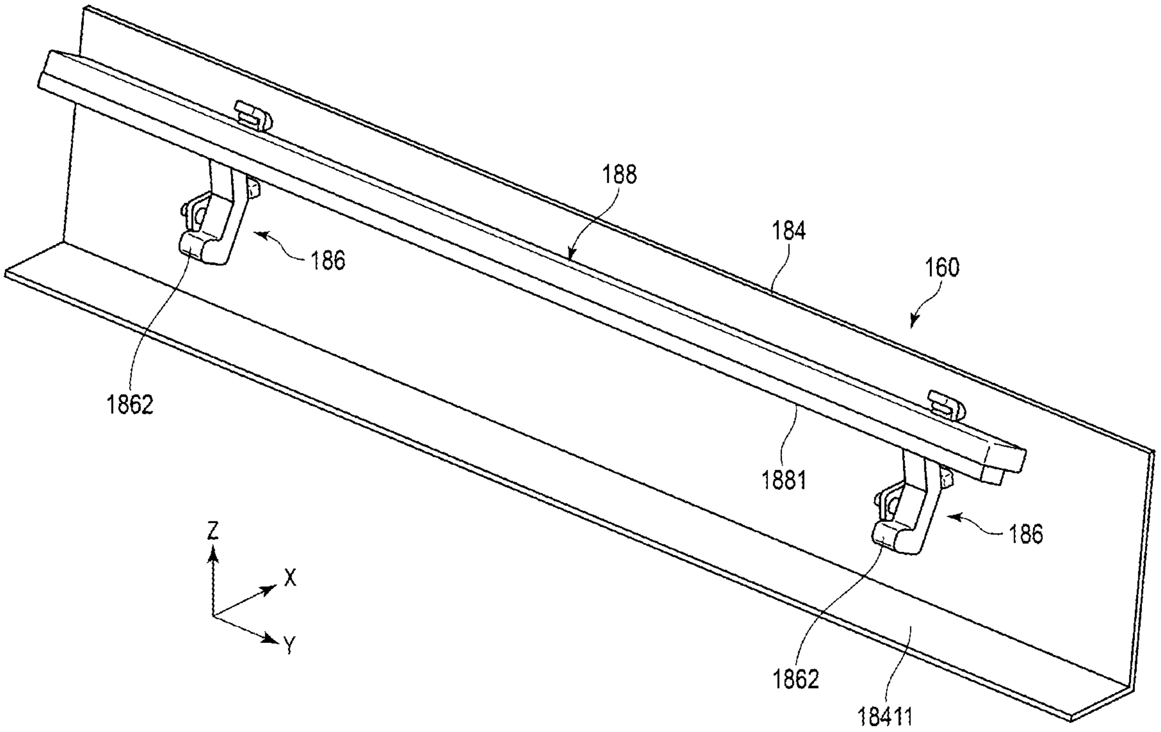
FIG. 9 is a perspective view illustrating a part of the shutter of the solid-state head unit.
Figure 10:
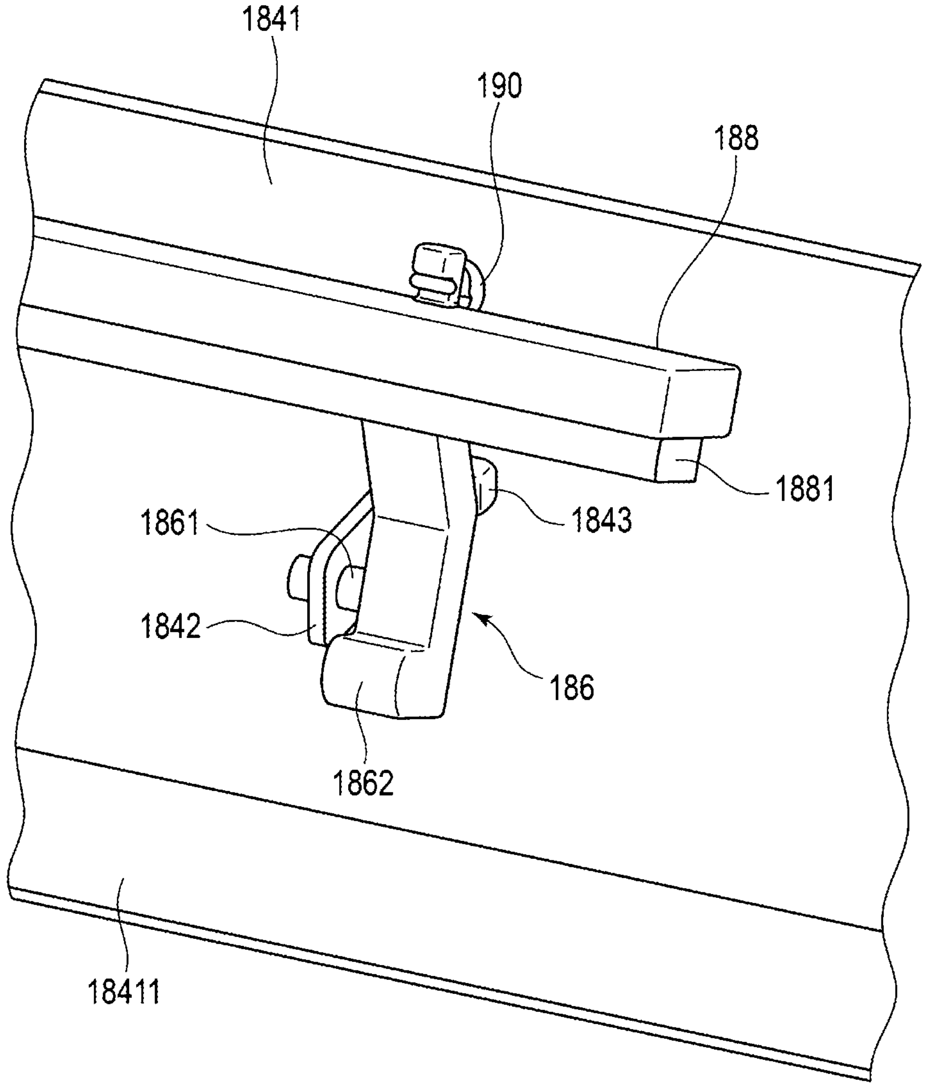
FIG. 10 is a perspective view illustrating a part of the shutter in FIG. 10.

FIG. 9 is a perspective view illustrating a part of the shutter 160 of the solid-state head unit 62. FIG. 10 is a perspective view illustrating a part of the shutter 160 in FIG. 9.

As illustrated in FIG. 1, the image forming apparatus 10 of the present embodiment includes an apparatus main body 12, a control unit 14, a sheet supply unit 16, a control panel 18, a scanner unit 20, a conveyance unit 22, and a printer 24, and a paper discharge unit 26.

The apparatus main body 12 (e.g., a housing) forms the front side, the back side, the right side, and the left side of the image forming apparatus 10. The sheet supply unit 16 is provided on the lower side of the apparatus main body 12. The control panel 18, the scanner unit 20, and the paper discharge unit 26 are provided on the upper side of the apparatus main body 12. The apparatus main body 12 is provided with the control unit 14, the conveyance unit 22, and the printer 24.

The control unit 14 controls the sheet supply unit 16, the control panel 18, the scanner unit 20, the conveyance unit 22, and the printer 24.

The sheet supply unit 16 (e.g., a sheet supply) includes, for example, a plurality of paper cassettes 32 (e.g., trays) that accommodate a large number of sheets 34. The sheet supply unit 16 picks up the sheets 34 necessary for image formation from each paper cassette 32 one by one. The sheet supply unit 16 supplies the picked-up sheet 34 to the conveyance unit 22.

The control panel 18 (e.g., a user interface, an operator interface, etc.) is formed as, for example, a touch panel that accepts user operations. The control panel 18 outputs a signal corresponding to the user's operation to the control unit 14.

The scanner unit 20 (e.g., a scanner) reads the image information to be read and outputs the image information to the control unit 14.

The conveyance unit 22 (e.g., a conveyor) conveys the sheet 34 supplied from the paper feed cassette 32 of the sheet supply unit 16 to the paper discharge unit 26 through the printer 24.

The printer 24 transfers and fixes the image read by, for example, the scanner unit 20 to the sheet 34 conveyed by the conveyance unit 22. The conveyance unit 22 discharges the sheet 34 on which the image is fixed by the printer 24 to the paper discharge unit 26.

Here, the printer 24 includes the image forming units 42, 44, 46, and 48, the toner cartridges 52, 54, 56, and 58, the solid-state head units 62, 64, 66, and 68, the transfer unit 72, and a fixing unit 74.

The image forming units 42, 44, 46, and 48, the toner cartridges 52, 54, 56, and 58, the solid-state head units 62, 64, 66, and 68, the transfer unit 72, and the fixing unit 74 are located in the apparatus main body 12. The apparatus main body 12 restricts movement in the ±X axis direction and the ±Z axis direction in a state where the image forming units 42, 44, 46, and 48, the toner cartridges 52, 54, 56, and 58, the solid-state head units 62, 64, 66, and 68, the transfer unit 72, and the fixing unit 74 are in the apparatus main body 12.

The image forming units 42, 44, 46, and 48 develop the image read by the scanner unit 20, for example, by using the toner supplied from the toner cartridges.

The solid-state head units 62, 64, 66, and 68 form an electrostatic latent image on the photoconductive drum 122 as a photoconductor, for example, based on the image read by the scanner unit 20.

As illustrated in FIGS. 1 and 2, the transfer unit 72 includes a transfer belt 202 (e.g., a transfer member), a transfer belt roller 204, a secondary transfer opposing roller 206, a support roller 208, a belt suspension roller 210, four primary transfer rollers 212, and a secondary transfer roller 214.

The transfer belt 202 is an endless belt. The transfer belt 202 is an intermediate transfer body that forms a toner image by the image forming units 42, 44, 46, and 48.

The transfer belt roller 204, the secondary transfer opposing roller 206, the support roller 208, and the belt suspension roller 210 apply tension to the transfer belt 202 to support the transfer belt 202. The transfer belt roller 204, the secondary transfer opposing roller 206, the support roller 208, and the belt suspension roller 210 each rotate about a corresponding central axis parallel to the Y axis. The transfer belt roller 204 rotates the transfer belt 202 in the direction of the arrow A by rotation. The secondary transfer opposing roller 206, the support roller 208, and the belt suspension roller 210 rotate according to the rotation of the transfer belt 202.

The image forming units 42, 44, 46, and 48 are arranged in ascending order along the direction of the arrow A on which the transfer belt 202 rotates (i.e., the transfer belt 202 rotates by the image forming unit 42, then by the image forming unit 44, then by the image forming unit 46, and finally by the image forming unit 48).

The primary transfer rollers 212 face the photoconductive drums 122 of the image forming units 42, 44, 46, and 48, respectively, through the transfer belt 202. A transfer bias is applied to the primary transfer roller 212 in synchronization with the photoconductive drum 122. The primary transfer rollers 212 primarily transfers the toner images formed on the photoconductive drums 122 of the image forming units 42, 44, 46, and 48 to the transfer belt 202, respectively. The formation of the toner images by the image forming units 42, 44, 46, and 48 and the movement of the transfer belt 202 are synchronized. The image forming units 42, 44, 46, and 48 transfer the toner images to the transfer belt 202 in order, and superimpose the toner images. The image forming units 42, 44, 46, and 48 illustrated in FIG. 2 form images of yellow (Y), magenta (M), cyan (C), and black (K), respectively, and transfer the images to the transfer belt 202 of the transfer unit 72. Therefore, a full-color image is formed on the transfer belt 202.

The secondary transfer roller 214 illustrated in FIG. 1 cooperates with the secondary transfer opposing roller 206 to form a secondary transfer unit that transfers the toner image that is primarily transferred to the transfer belt 202 to the sheet 34. The secondary transfer roller 214 faces the secondary transfer opposing roller 206 through the transfer belt 202. The outer peripheral surface of the secondary transfer roller 214 comes into contact with the transfer belt 202. The secondary transfer roller 214 rotates according to the circulation of the transfer belt 202. The secondary transfer roller 214 transfers the toner image on the transfer belt 202 to the sheet 34.

The image forming units 42, 44, 46, and 48 all have substantially the same structure except for the difference in toner color. Therefore, in the present embodiment, the image forming unit 42 will be described, and the description of the image forming units 44, 46, and 48 will be omitted. Similarly, the toner cartridges 52, 54, 56, and 58 all have substantially the same structure. Therefore, in the present embodiment, the toner cartridge 52 will be described, and the description of the toner cartridges 54, 56, and 58 will be omitted. Similarly, the solid-state head units 62, 64, 66, and 68 all have substantially the same structure. Therefore, in the present embodiment, the solid-state head unit 62 will be described, and the description of the solid-state head units 64, 66, and 68 will be omitted.

The image forming unit 42 is attached to the apparatus main body 12 of the image forming apparatus 10 in a replaceable way (e.g., the image forming unit 42 is removably coupled to the apparatus main body 12). The image forming unit 42 is attached to and detached from the apparatus main body 12 by being inserted and removed from the front side of the image forming apparatus 10 along the Y axis.

As illustrated in FIGS. 3 and 4, the image forming unit 42 includes the photoconductive unit 120. The photoconductive unit 120 includes the photoconductive drum 122 and a support frame 124 (e.g., a cleaner case) that supports the photoconductive drum 122.

The photoconductive drum 122 is formed in a cylindrical shape. The photoconductive drum 122 rotates, for example, about a central axis parallel to the Y axis.

The support frame 124 includes a protrusion 1241 (e.g., a dowel) that is inserted into a wall portion 16221 (e.g., a dowel hole) of the exposure device 152. The protrusion 1241 has a size that fits into the wall portion 16221.

As illustrated in FIGS. 5 and 6, the solid-state head unit 62 includes the exposure device 152, a base 154, a moving mechanism 156, an urging body 158, and the shutter 160.

The exposure device 152 (e.g., an exposure assembly) includes the print head 162 that exposes the photoconductive drum 122 to form a latent image on the photoconductive drum 122, and a holder 164 that holds the print head 162.

The print head 162 extends in the longitudinal direction in the Y axis direction of the image forming apparatus 10 and is disposed inside the apparatus main body 12 of the image forming apparatus 10. The print head 162 includes a light source 1621 and fixed portions 1622 fixed to both ends of the light source 1621.

The light source 1621 has a surface facing the photoconductive drum 122. The light emitting element of the light source 1621 includes, for example, an LED or an organic EL (OLED). As light emitting elements, for example, LED elements are arranged along the Y-axis direction. The surface of the light source 1621 is disposed on the optical path of the light emitting element between the light source 1621 and the photoconductive drum 122.

A pair of fixed portions 1622 include the wall portion 16221 (e.g., the dowel hole) formed, for example, as a dowel hole of a concave hole or a through hole, respectively. The pair of wall portions 16221 are separated from one another in the Y-axis direction. The pair of wall portions 16221 are formed at positions facing the protrusion 1241 illustrated in FIG. 3 of the support frame 124 of the photoconductive unit 120.

As illustrated in FIGS. 3 to 6, the holder 164 includes a pair of abutting portions 1641. A pair of abutting portions 1641 separate in the Y-axis direction. The pair of abutting portions 1641 are located at both ends of the holder 164 in the longitudinal direction. Therefore, the distance between the pair of abutting portions 1641 is larger than the distance between the pair of wall portions 16221. The pair of abutting portions 1641 abut the support frame 124 of the photoconductive unit 120, respectively if the exposure device 152 approaches the photoconductive drum 122.

As illustrated in FIG. 6, a pair of urging bodies 158 (e.g., springs) are disposed between the print head 162 and the holder 164. The pair of urging bodies 158 separate in the Y-axis direction, for example, like the wall portion 16221. The pair of urging bodies 158 urge the light source 1621 of the print head 162 toward the photoconductive drum 122 with respect to the holder 164. The pair of urging bodies 158 are formed, for example, by compression coil springs. The pair of urging bodies 158 may be formed of, for example, a columnar rubber material that is elastically deformed.

As illustrated in FIGS. 3, 4, and 6, the base 154 has a plate shape whose longitudinal direction is along the Y-axis direction. The base 154 is supported, for example, by the apparatus main body 12. The base 154 supports a part of the moving mechanism 156.

The moving mechanism 156 is provided between the base 154 and the exposure device 152. The moving mechanism 156 supports the exposure device 152 and moves the light source 1621 of the exposure device 152 between a proximity position close to the photoconductive drum 122 and a separation position away from the photoconductive drum 122. The moving mechanism 156 causes the exposure device 152 to reciprocate in the uniaxial direction with respect to the base 154. The uniaxial direction is a direction in which the exposure device 152 is brought close to and separated from the support frame 124 of the photoconductive unit 120. In FIGS. 3, 4, and 6, the uniaxial direction is drawn along the ±Z axis, but the uniaxial direction may be inclined with respect to the ±Z axis.

The moving mechanism 156 includes a slider 172 that can move in the longitudinal direction of the base 154, a spring 174 that urges the slider 172, a lever 176 for moving the slider 172, and a link mechanism 178.

The slider 172 is movably supported by the base 154 in the longitudinal direction along the Y-axis direction.

One end of the spring 174 is fixed to the base 154 and the other end is fixed to the slider 172. The spring 174 urges the slider 172 toward the lever 176 along the Y-axis direction.

The lever 176 is rotatable about the Y axis. The lever 176 moves the slider 172 against the urging force of the spring 174 by rotating the lever 176 from a first position to a second position in a first direction. If the lever 176 is rotated in the first direction, the slider 172 moves toward the spring 174 against the urging force of the spring 174. Conversely, if the lever 176 is rotated from the second position to the first position in a second direction opposite to the first direction, the slider 172 moves toward the lever 176 by the urging force of the spring 174.

The link mechanism 178 converts the longitudinal movement of the slider 172 into the movement of the holder 164 in the longitudinally intersecting direction. As the link mechanism 178, for example, a Scott Russell linkage is used. The Scott Russell linkage 178 transforms the longitudinal movement of the slider 172 into the vertical movement of the holder 164 in the longitudinal direction.

As illustrated in FIGS. 5, 7, and 8, the shutter 160 retracts from the light source 1621 if the light source 1621 of the exposure device 152 is moved to a position close to the photoconductive drum 122. The shutter 160 covers the optical path of the light source 1621 if the light source 1621 of the exposure device 152 is moved to a separation position away from the photoconductive drum 122. The shutter 160 includes, for example, a pair of protrusions 182 provided on the exposure device 152, the support portion 184 (e.g., a wall), a pair of links 186, a shutter member 188, and a pair of urging members 190.

The pair of protrusions 182 (e.g., cams) are provided, for example, in the holder 164 of the exposure device 152. The pair of protrusions 182 project from the holder 164 in the +X-axis direction and are offset from one another in the Y-axis direction. One protrusion 182 is provided, for example, in the vicinity of the urging body 158 on the front side. The other protrusion 182 is provided in the vicinity of the urging body 158 on the back side. The pair of protrusions 182 include a curved or inclined surface, such as a semicircular or a hemispherical shape. The pair of protrusions 182 may be formed integrally with the holder 164. The pair of protrusions 182 may be provided on the print head 162.

The support portion 184 includes a partition wall 1841, a pair of rotation support portions 1842, and a pair of link receiving portions 1843. It is also preferable that the support portion 184 is fixed to the base 154.

The partition wall 1841 is formed as a wall separating the image forming unit 42 and the solid-state head unit 62 from the image forming unit 44 and the solid-state head unit 64 adjacent thereto. Therefore, in the present embodiment, the partition wall 1841 is provided at a position in the +X-axis direction with respect to the exposure device 152. The partition wall 1841 has an extension portion 18411 extending in the −X-axis direction at a portion on the −Z-axis direction side. The extension portion 18411 is fixed to, for example, the base 154. If the partition wall 1841 is viewed from the front side or the back side of the image forming apparatus 10, the partition wall 1841 is formed in a substantially L shape by combining, for example, a flat plate along a YZ plane and a flat plate along an XY plane (i.e., the extending portion 18411). The partition wall 1841 may have no extension portion 18411 and may simply have a flat plate shape along the YZ plane, for example.

The pair of rotation support portions 1842 project from the partition wall 1841 in the −X-axis direction, respectively. The rotation support portion 1842 rotatably supports the link 186 around the Y axis.

The pair of link receiving portions 1843 (e.g., stops) are fixed to the partition wall 1841. A pair of link receiving portions 1843 project from the partition wall 1841 in the −X-axis direction, respectively. The amount of projection of the pair of link receiving portions 1843 with respect to the partition wall 1841 is smaller than the amount of projection of the rotation support portion 1842, respectively. The pair of link receiving portions 1843 abut the link 186 if the shutter 160 retracts from the light source 1621 of the exposure device 152, and separate from the link 186 if the shutter 160 covers the optical path of the light source 1621 of the exposure device 152, respectively.

The pair of links 186 include a rotating shaft 1861, an abutting portion 1862, a shutter member support portion 1863, and a positioning portion 1864, respectively.

The rotating shaft 1861 is supported by the rotation support portion 1842. The rotating shaft 1861 is parallel to, for example, the Y axis. That is, the rotating shaft 1861 is along the longitudinal direction of the exposure device 152.

The abutting portion 1862 and the shutter member support portion 1863 draw an arc-shaped locus by the rotating shaft 1861 around the axis.

The abutting portion 1862 (e.g., a cam) projects in the −X-axis direction toward the holder 164 with respect to the rotating shaft 1861. The abutting portion 1862 has a curved surface or an inclined surface such as a semicircular shape or a hemispherical shape. By the rotation of the rotating shaft 1861 around the axis, the abutting portion 1862 abuts on the curved surface or the inclined surface of the protrusion 182 as the light source 1621 of the exposure device 152 moves from the proximity position to the separation position, and is separated from the protrusion 182 as the light source 1621 of the exposure device 152 moves from the separation position to the proximity position.

The shutter member support portion 1863 supports the shutter member 188 extending in the Y-axis direction at one or a plurality of locations. The shutter member 188 extends along the Y-axis direction. It is preferable that the shutter member 188 is continuous in the Y-axis direction. The shutter member 188 is formed of, for example, a metal material or a resin material. The shutter member 188 includes a cleaning member 1881 that cleans the surface of the light source 1621 on the optical path. The cleaning member 1881 is located on the optical path of the light source 1621 of the print head 162 and in contact with the surface of the light source 1621 of the print head 162. For the cleaning member 1881, for example, a non-woven fabric or the like is used. It is preferable that the cleaning member 1881 is continuous in the Y-axis direction.

The positioning portion 1864 abuts on and is separated from the link receiving portion 1843 by the rotation of the link 186. The positioning portion 1864 abuts on the link receiving portion 1843 when moving from the −X-axis direction to the +X-axis direction. The positioning unit 1864 is separated from the link receiving unit 1843 when moving from the +X-axis direction to the −X-axis direction.

One end of the urging member 190 is supported by the partition wall 1841, and the other end is supported by the link 186 or the shutter member 188. The urging member 190 urges the link 186 in the +X-axis direction. An example of the urging member 190 is a tension spring whose one end is supported at a position away from the rotating shaft 1861 of the link 186 and the other end is supported by the support portion 184. It is also preferable that the urging member 190 is made of a stretchable rubber material.

Next, the operations of the image forming unit 42 and the solid-state head unit 62 of the image forming apparatus 10 will be described.

The moving mechanism 156 illustrated in FIGS. 3, 4, and 6 moves the slider 172 in the direction of the spring 174 by rotating the lever 176 in the first direction from the first position (see FIG. 7) to the second position (see FIG. 8) around the Y axis. As the slider 172 moves, the exposure device 152 moves toward the support frame 124 of the photoconductive unit 120 by the operation of the link mechanism 178. Therefore, the moving mechanism 156 brings the exposure device 152 closer (i.e., the exposure device 152 is raised) toward the support frame 124 of the photoconductive unit 120, as illustrated in FIGS. 4 and 6.

The moving mechanism 156 moves the slider 172 in a direction away from the spring 174 by rotating the lever 176 in the second direction opposite to the first direction from the second position (see FIG. 8) to the first position (see FIG. 7) around the Y axis. As the slider 172 moves, the exposure device 152 moves away from the support frame 124 of the photoconductive unit 120 by the operation of the link mechanism 178. Therefore, the moving mechanism 156 separates the exposure device 152 from the support frame 124 of the photoconductive unit 120 (i.e., the moving mechanism 156 lowers the exposure device 152).

The directions in which the exposure device 152 approaches and is separated from the support frame 124 of the photoconductive unit 120 are directions that intersect the moving direction of the slider 172, and are preferably vertical, for example.

Here, as illustrated in FIGS. 7 and 8, if the photoconductive unit 120 is not disposed in the apparatus main body 12, the maximum moving stroke of the exposure device 152 by the moving mechanism 156 is larger than the gap defined between the exposure device 152 and the outer peripheral surface of the photoconductive drum 122. The maximum moving stroke of the moving mechanism 156 means the maximum distance that the exposure device 152 can move by the moving mechanism 156 in the absence of the photoconductive unit 120.

The moving mechanism 156 moves the exposure device 152 from the state of being at a separation position from the photoconductive unit 120 illustrated in FIG. 3 to the state of being at a proximity position close to the photoconductive unit 120 illustrated in FIG. 4. If the photoconductive unit 120 is disposed in the apparatus main body 12, the moving distance of the exposure device 152 is smaller than the maximum moving stroke of the exposure device 152. Therefore, if the exposure device 152 is moved to a proximity position close to the photoconductive unit 120 as illustrated in FIG. 4, the exposure device 152 exerts an urging force on the photoconductive unit 120.

As illustrated in FIGS. 3 to 6, in a state where the photoconductive unit 120 is disposed in the apparatus main body 12, the lever 176 is rotated from the first position to the second position in the first direction, and the exposure device 152 approaches the support frame 124. A pair of protrusions 1241 of the support frame 124 are inserted into the pair of wall portions 16221 (e.g., dowel holes) separated from the exposure device 152 in the Y-axis direction. Therefore, the exposure device 152 is guided toward the support frame 124.

As illustrated in FIG. 3, it is assumed that the outer peripheral surface of the photoconductive drum 122 is not disposed parallel to the print head 162 in a state where the exposure device 152 and the photoconductive unit 120 separate from each other. If the exposure device 152 approaches the support frame 124 by the moving mechanism 156, for example, one of the pair of the abutting portions 1641 illustrated in FIG. 4 first abuts on the support frame 124. The exposure device 152 then continues to approach the support frame 124 by the moving mechanism 156 and the pair of urging bodies 158. Therefore, the other abutting portion 1641 abuts on the support frame 124.

Here, the image forming unit 42 disposed in the apparatus main body 12 is restricted from moving in the vertical direction and the horizontal direction. Therefore, if the exposure device 152 is at a proximity position close to the support frame 124, the support frame 124 receives an urging force from the pair of urging bodies 158 of the solid-state head unit 62 via the exposure device 152. The pair of urging bodies 158 urges both ends of the print head 162 upward, respectively. Therefore, the photoconductive drum 122 of the photoconductor 120 and the pair of print heads 162 are disposed in a desired state. As a result, the light source 1621 of the print head 162 of the exposure device 152 is disposed parallel to the outer peripheral surface of the photoconductive drum 122. Therefore, in a state where the photoconductive unit 120 is disposed in the apparatus main body 12, a predetermined distance is formed between the light source 1621 of the print head 162 of the exposure device 152 and the outer peripheral surface of the photoconductive drum 122.

The pair of urging bodies 158 disposed between the print head 162 and the holder 164 apply a predetermined abutment load with respect to the photoconductive drum 122 to the print head 162 if the print head 162 is closest to the photoconductive drum 122. That is, the pair of urging bodies 158 are urged toward the central axis of the photoconductive drum 122 supported by the support frame 124 via the print head 162. As described above, the urging direction of the print head 162 by the pair of urging bodies 158 is the direction intersecting the rotation axis of the photoconductive drum 122 of the photoconductor 120.

In the present embodiment, as illustrated in FIGS. 4 and 8, if the exposure device 152 is at a proximity position, the abutting portion 1862 is disposed in a state of being separated from the lower side of the protrusion 182. As illustrated in FIGS. 3 and 7, if the exposure device 152 is at a separation position, the apex of the protrusion 182 in the X-axis direction or the vicinity thereof abuts on the apex of the abutting portion 1862 of the link 186 or the vicinity thereof.

If the exposure device 152 moves from the position illustrated in FIGS. 3 and 7 to the position illustrated in FIGS. 4 and 8 toward the support frame 124 of the photoconductive unit 120, the protrusion 182 moves toward the support frame 124 together with the exposure device 152. Since the abutting portion 1862 of the link 186 only rotates around the axis of the rotating shaft 1861, the abutting portion 1862 is separated from the protrusion 182. Since the shutter member 188 is urged by the urging member 190 in a direction close to the partition wall 1841 of the support portion 184, the shutter member 188 retracts from the optical path of the light source 1621 of the print head 162. Here, the cleaning member 1881 cleans the surface of the light source 1621 of the print head 162. The cleaning member 1881 is separated from the exposure device 152 in the +X-axis direction after cleaning the surface of the light source 1621 of the print head 162.

The positioning portion 1864 of the link 186 abuts on the link receiving portion 1843. Here, the support portion 184 and the pair of links 186 are positioned in a predetermined positional relationship. Here, a predetermined distance is formed between the light source 1621 of the print head 162 of the exposure device 152 and the outer peripheral surface of the photoconductive drum 122. Therefore, the print head 162 is positioned at a predetermined position to secure a predetermined focal length with respect to the photoconductive drum 122. Therefore, the print head 162 forms a good latent image on the photoconductive drum 122.

If the exposure device 152 moves away from the support frame 124 of the photoconductive unit 120 from the position illustrated in FIGS. 4 and 8 to the position illustrated in FIGS. 3 and 7, the protrusion 182 moves away from the support frame 124 together with the exposure device 152. Since the abutting portion 1862 of the link 186 only rotates around the axis of the rotating shaft 1861, the protrusion 182 abuts on the abutting portion 1862.

If the protrusion 182 moves in a direction away from the support frame 124, while the curved surface of the protrusion 182 and the curved surface of the abutting portion 1862 slide, the abutting portion 1862 is pushed away in the +X-axis direction by the protrusion 182, and the shutter member support portion 1863 moves in the −X-axis direction. Therefore, the link 186 rotates around the axis of the rotating shaft 1861 against the urging force of the urging member 190.

If the link 186 rotates around the axis of the rotating shaft 1861 against the urging force of the urging member 190, the shutter member 188 covers the optical path of the light source 1621 of the print head 162. Therefore, the shutter member 188 moves to a cover position that covers the optical path of the light source 1621 of the print head 162. Here, the cleaning member 1881 cleans the surface of the light source 1621 of the print head 162. The cleaning member 1881 remains in contact with the surface of the light source 1621 of the print head 162.

In FIG. 7, the apex of the protrusion 182 and the apex of the abutting portion 1862 abut with each other. The top of the protrusion 182 and the top of the abutting portion 1862 may be displaced in contact with each other.

If the exposure device 152 is at a retraction position away from the photoconductive unit 120, the exposure device 152 covers the optical path of the light source 1621 of the print head 162. Therefore, if the exposure device 152 is at the retraction position away from the photoconductive unit 120, the image forming apparatus 10 protects the exposure device 152. If the exposure device 152 is at a proximity position close to the photoconductive unit 120, the exposure device 152 retracts from the optical path of the light source 1621 of the print head 162. Therefore, if the exposure device 152 is at a proximity position close to the photoconductive unit 120, the image forming apparatus 10 exposes the photoconductive drum 122 by the exposure device 152.

As described above, the shutter 160 according to the image forming apparatus 10 according to the present embodiment retracts from the light source 1621 if the light source 1621 of the exposure device 152 is moved to a proximity position close to the photoconductive drum 122 by moving the exposure device 152. Therefore, the link 186 moves the shutter member 188 away from the protrusion 182 to a retraction position where the shutter member 188 is retracted from the light source 1621 as the light source 1621 of the exposure device 152 moves from the separation position to the proximity position. The shutter 160 covers the optical path of the light source 1621 if the light source 1621 of the exposure device 152 is moved to a separation position away from the photoconductive drum 122. Therefore, the link 186 moves the shutter member 188 to a cover position where the shutter member 188 abuts on the protrusion 182 and covers the optical path as the light source 1621 of the exposure device 152 moves from the proximity position to the separation position.

Therefore, if the light source 1621 of the exposure device 152 is moved to a proximity position close to the photoconductive drum 122, the shutter 160 is retracted from the light source 1621 so that the photoconductive drum 122 can be exposed from the print head 162. Then, if the light source 1621 of the exposure device 152 is moved to a proximity position close to the photoconductive drum 122, the surface of the print head 162 can be cleaned by the cleaning member 1881.

If the light source 1621 of the exposure device 152 is moved to a separation position away from the photoconductive drum 122, the shutter 160 covers the optical path of the light source 1621. Therefore, for example, the surface of the print head 162 can be protected during maintenance of the photoconductive unit 120. Then, if the light source 1621 of the exposure device 152 is moved to a separation position away from the photoconductive drum 122, the surface of the print head 162 can be cleaned by the cleaning member 1881.

Therefore, if cleaning the surface of the print head 162 of the image forming apparatus 10 according to the present embodiment, it is not necessary to prepare a cleaning rod as a separate part, and cleaning work is also unnecessary. The surface of the print head 162 is maintained as protected as much as possible until the light source 1621 of the exposure device 152 is moved from the separation position to the proximity position with respect to the photoconductive drum 122. Therefore, it is possible to reduce the possibility of dust or the like adhering to the surface of the print head 162 until the light source 1621 of the exposure device 152 is moved from the separation position to the proximity position with respect to the photoconductive drum 122. The surface of the print head 162 is protected until the light source 1621 of the exposure device 152 is moved from the proximity position to the separation position with respect to the photoconductive drum 122. Therefore, it is possible to reduce the possibility of dust or the like adhering to the surface of the print head 162 until the light source 1621 of the exposure device 152 is moved from the proximity position to the separation position with respect to the photoconductive drum 122.

Therefore, according to the present embodiment, it is possible to reduce the possibility of dust or the like adhering to the surface of the print head 162 until the light source 1621 of the exposure device 152 is moved from the separation position to the proximity position, and from the proximity position to the separation position with respect to the photoconductive drum 122.

In an alternative embodiment, the protrusion 1241 of the support frame 124 described in the present embodiment may be a wall portion forming a concave hole or a through hole, and the wall portion 16221 (e.g., dowel hole) of the fixed portion 1622 of the print head 162 may be a protrusion.

In the present embodiment, the image forming unit 42 and the solid-state head unit 62 were described. The image forming units 44, 46, and 48 have the same structure as the image forming unit 42, and the solid-state head units 64, 66, and 68 have the same structure as the solid-state head unit 62. Therefore, the relationship between the image forming unit 44 and the solid-state head unit 64, the relationship between the image forming unit 46 and the solid-state head unit 66, and the relationship between the image forming unit 48 and the solid-state head unit 68 are also configured in the same manner as the relationship between the image forming unit 42 and the solid-state head unit 62.

In the present embodiment, an example in which the link 186 is provided on the support portion 184 was described. It is also preferred that the base 154 be configured to support the link 186, for example.

In the embodiment, an example in which the rotation support portion 1842 is provided on the partition wall 1841 was described. In the embodiment, an example in which the urging member 190 is supported by the partition wall 1841 was described. For example, it is also preferable that the base 154 or the apparatus main body 12 is provided with the rotation support portion 1842 and the urging member 190. Here, the partition wall 1841 may be unnecessary.

Figure 11:
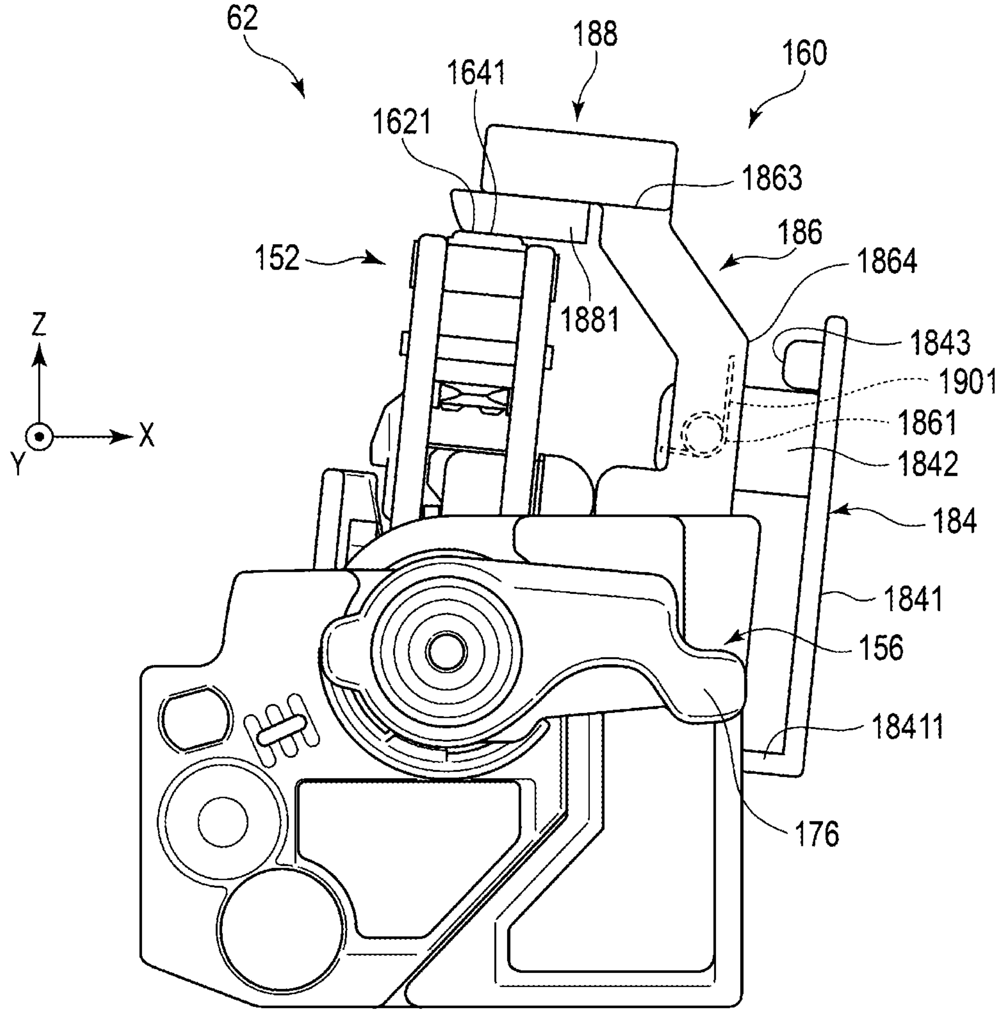
FIG. 11 is a side view illustrating a state in which the print head is protected by the shutter member of the shutter of the solid-state head unit.
Figure 12:
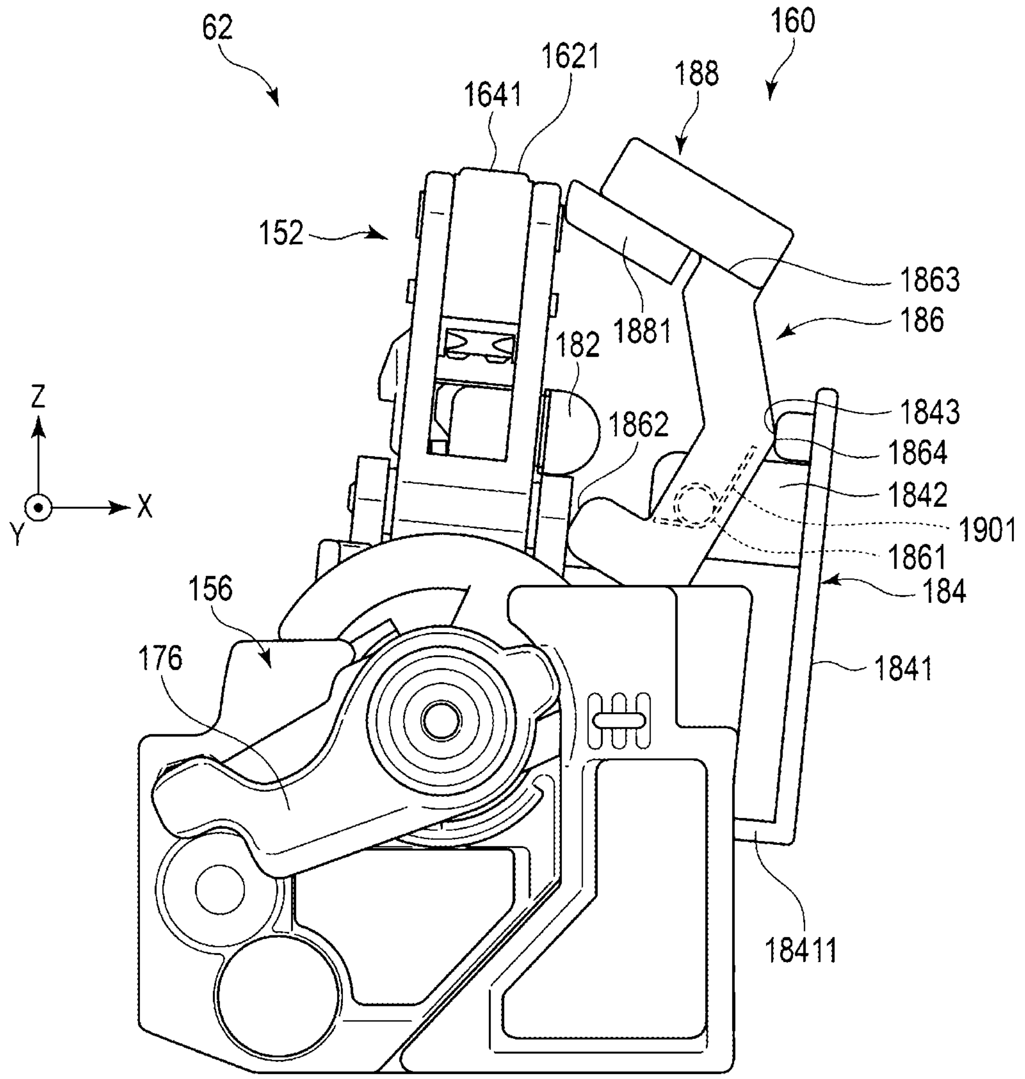
FIG. 12 is a side view illustrating a state in which the shutter member of the shutter of the solid-state head unit is retracted from the print head.

As illustrated in FIGS. 11 and 12, it is also preferable that the urging member 190 uses a torsion spring instead of the tension spring. Here, the urging member 190 is disposed between the rotating shaft 1861 of the link 186 and the rotation support portion 1842 of the support portion 184. Even here, the solid-state head unit 62 operates in the same manner as the solid-state head unit 62 illustrated in FIGS. 7 and 8.

In the present embodiment, the protrusion 182 and the abutting portion 1862 of the link 186 come into contact with and separate from each other. Therefore, the rotation of the lever 176 and the link 186 of the shutter 160 are interlocked partially. It is also preferable that the rotation of the lever 176 and the link of the shutter 160 are completely interlocked with each other.

According to at least one embodiment described above, it is possible to provide an image forming apparatus capable of reducing the possibility of dust or the like adhering to the surface of a light source until the light source of the exposure device is moved from the separation position to the proximity position, and from the proximity position to the separation position with respect to the photoconductive drum.

While certain embodiments have been described, these embodiments have been presented by way of example only, and are not intended to limit the scope of the invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus comprising:

a photoconductor;

a light source configured to expose the photoconductor, the light source being repositionable relative to the photoconductor; and a shutter assembly including:

a cleaning member repositionable between (a) a first position in which the cleaning member contacts a surface of the light source that faces the photoconductor and (b) a second position in which the cleaning member is separated from the surface of the light source, the shutter assembly being configured to move the cleaning member between the first position and the second position in response to movement of the light source relative to the photoconductor;

a link coupled to the cleaning member and configured to rotate about an axis, the link including a rotating shaft;

a protrusion coupled to the light source and configured to engage the link to move the cleaning member from the second position to the first position; and a torsion spring provided on the rotating shaft of the link and configured to urge the cleaning member toward the second position.

2. The image forming apparatus of claim 1, wherein the shutter assembly includes a support portion that rotatably supports the link.

3. An image forming apparatus comprising:

a photoconductor;

a light source configured to expose the photoconductor, the light source being repositionable relative to the photoconductor;

a movement mechanism including a lever, wherein rotating the lever repositions the light source in a uniaxial direction between a first light source position proximate the photoconductor and a second light source position spaced from the photoconductor; and a shutter assembly including a cleaning member repositionable between (a) a first cleaning member position in which the cleaning member contacts a surface of the light source that faces the photoconductor and (b) a second cleaning member position in which the cleaning member is separated from the surface of the light source, the shutter assembly configured to move the cleaning member between the first cleaning member position and the second cleaning member position in response to movement of the light source relative to the photoconductor;

wherein the first cleaning member position is a position where the cleaning member (a) contacts the surface of the light source that faces the photoconductor that has been moved to the second light source position by the movement mechanism and (b) covers an optical path of the light source.

4. The image forming apparatus of claim 3, wherein the shutter assembly includes a link coupled to the cleaning member and configured to rotate about an axis, and wherein the light source includes a protrusion configured to selectively engage the link to move the cleaning member from the second cleaning member position to the first cleaning member position.

5. The image forming apparatus of claim 4, wherein the shutter assembly includes a spring coupled to the link and configured to bias the link and, thereby, the cleaning member toward the second cleaning member position.

6. The image forming apparatus of claim 5, wherein the spring is a tension spring.

7. The image forming apparatus of claim 5, wherein the spring is a torsion spring.

8. An image forming apparatus comprising:

a light source configured to be repositionable relative to a photoconductor, the light source including a protrusion;

a shutter assembly including:

a shutter repositionable between (a) a first position in which a portion of the shutter engages a surface of the light source and (b) a second position in which the portion of the shutter is separated from the surface of the light source; and a link coupled to the shutter and pivotable about an axis; and a movement mechanism including a lever, wherein rotating the lever repositions the light source in a uniaxial direction toward and away from the photoconductor;

wherein the protrusion selectively engages the link to pivot the link about the axis and, thereby, reposition the shutter from the second position to the first position.

9. The image forming apparatus of claim 8, wherein the shutter assembly includes a spring coupled to the link, the spring configured to bias the shutter toward the second position.

10. The image forming apparatus of claim 9, wherein the spring is a tension spring.

11. The image forming apparatus of claim 9, wherein the spring is a torsion spring.

12. The image forming apparatus of claim 8, further comprising the photoconductor.

13. An image forming apparatus comprising:

a photoconductor;

a light source configured to expose the photoconductor, the light source being repositionable relative to the photoconductor; and a shutter assembly including:

a cleaning member repositionable between (a) a first position in which the cleaning member contacts a surface of the light source that faces the photoconductor and (b) a second position in which the cleaning member is separated from the surface of the light source, the shutter assembly being configured to move the cleaning member between the first position and the second position in response to movement of the light source relative to the photoconductor;

a link coupled to the cleaning member and configured to rotate about an axis;

a protrusion coupled to the light source and configured to engage the link to move the cleaning member from the second position to the first position;

a support portion that rotatably supports the link; and a tension spring coupled to the link and configured to urge the cleaning member toward the second position, the tension spring having a first end supported at a position offset from a rotating shaft of the link and a second end supported by the support portion.

* * * * *